US012643302B2

(12) United States Patent
Resch et al.

(10) Patent No.: US 12,643,302 B2
(45) Date of Patent: Jun. 2, 2026

(54) RECYCLABLE COMPOSTABLE PAPER BAG

(71) Applicant: The Paper People LLC, Elcho, WI (US)

(72) Inventors: Mark Resch, Antigo, WI (US); Neil Bretl, Antigo, WI (US)

(73) Assignee: The Paper People LLC, Elcho, WI (US)

(*) Notice: Subject to any disclaimer, the term of this patent is extended or adjusted under 35 U.S.C. 154(b) by 59 days.

(21) Appl. No.: 18/535,681

(22) Filed: Dec. 11, 2023

(65) Prior Publication Data

US 2024/0131814 A1 Apr. 25, 2024

Related U.S. Application Data

(63) Continuation of application No. 17/005,967, filed on Aug. 28, 2020, now Pat. No. 11,897,226.

(Continued)

(51) Int. Cl.

*B31B 70/00* (2017.01)
*B31B 70/16* (2017.01)

(Continued)

(52) U.S. Cl.

CPC ............ *B31B 70/826* (2017.08); *B31B 70/16* (2017.08); *B31B 70/62* (2017.08); *B31B 70/83* (2017.08);

(Continued)

(58) Field of Classification Search

CPC ......... B31B 19/00; B31B 19/82; B31B 49/04; B31B 17/00; B29C 53/04; B29C 65/52

(Continued)

(56) References Cited

U.S. PATENT DOCUMENTS 1,983,291 A 12/1934 Haskell
2,054,298 A 9/1936 Poppe (Continued)

FOREIGN PATENT DOCUMENTS

BE 1015371 A6 * 2/2005 ............. B65D 33/01
EP 2070831 A1 6/2009

(Continued)

OTHER PUBLICATIONS

International Search Report and Written Opinion for PCT/US2020/048432 issued on Nov. 20, 2020.

*Primary Examiner* — Jacob A Smith
(74) *Attorney, Agent, or Firm* — Godfrey & Kahn, S.C.; Erin Ella Block

(57) ABSTRACT

The present invention is directed to a produce bag. More specifically, the present invention is directed to a completely recyclable and compostable grocery-type bag for use with produce and other goods. Ideally, the bag is a calendared single-ply paper with heat-sealed seams that is resistant to destruction from moisture. While produce is contemplated, the bag can be used to contain virtually any product. Preferably, such a bag would have a window or an opening so that produce can be viewed and readily identified. The present invention is further directed to a process for creating and filling the above bag. Using a standard printing machine, the adhesive is printed onto the paper in register to desired locations on the paper to form the seams of the bag and, optionally border a window area to be cut out of the paper. If the bag is to include a window opening, the window opening is cut out within the area of applied heat-activated adhesive and a screen cover to the window such that the border of the screen cover is applied to overlap the heat-activated adhesive. Optionally, a recyclable and compostable patch can be placed around the window such that the patch covers the edge of the screen and the heat-activated (Continued)

adhesive to form a border for the window. The patch and screen cover to the window, if present, are adhesively sealed to the paper by heat activation. One method of assembling the bag includes forming the adhesive applied paper to create a tube of paper such that the heat-activated adhesive overlaps the paper, heat sealing the paper into a tube, automatedly filling the tube with product, heat sealing the bottom edge and top edge of the product-filled tube to form an enclosed bag with product therein. The forming and filling can be accomplished on already existing automated forming and filling machines manufactured for use with plastic bags and plastic lined paper bags. Thusly creating a sealed, filled paper bag that is a single ply unlined paper with a mesh covering attached to the paper without the need for reinforcement that can withstand the moisture released from the contents and is 100% recyclable and compostable.

7 Claims, 8 Drawing Sheets

Related U.S. Application Data

(60) Provisional application No. 62/893,345, filed on Aug. 29, 2019.

(51) Int. Cl.
*B31B 70/62* (2017.01)
*B31B 70/82* (2017.01)
*B31B 70/83* (2017.01)
*B31B 70/88* (2017.01)
*B65D 33/00* (2006.01)
*B31B 170/00* (2017.01)

(52) U.S. Cl.
CPC ............ *B31B 70/88* (2017.08); *B65D 33/004* (2013.01); *B31B 2170/00* (2017.08); *B65D 2203/00* (2013.01)

(58) Field of Classification Search
USPC ................ 493/223, 243, 264, 235, 210, 480
See application file for complete search history.

(56) References Cited

U.S. PATENT DOCUMENTS

| | | | | | |
|---|---|---|---|---|---|
| 2,330,446 | A | | 9/1943 | Piazze | |
| 2,428,266 | A | | 9/1947 | Daniels | |
| 2,739,755 | A | | 3/1956 | Ottinger | |
| 2,745,593 | A | | 5/1956 | Brady | |
| 2,759,400 | A | | 8/1956 | Randall | |
| 3,035,754 | A | | 5/1962 | Meister | |
| 3,654,006 | A | * | 4/1972 | Heller, Jr. | B31B 50/82 493/380 |
| 3,973,045 | A | | 8/1976 | Brandberg | |
| 4,493,685 | A | | 1/1985 | Blamer | |
| 4,566,927 | A | * | 1/1986 | Wood | B29C 66/91921 156/203 |
| 4,727,706 | A | | 3/1988 | Beer | |
| 4,866,786 | A | | 9/1989 | Nagler | |
| 5,226,735 | A | | 7/1993 | Beliveau | |
| 5,520,464 | A | * | 5/1996 | Kristola | B65D 31/08 383/126 |
| 5,753,895 | A | | 5/1998 | Olson | |
| 5,823,683 | A | | 10/1998 | Antonacci | |
| 6,056,681 | A | | 5/2000 | Ross | |
| 6,884,978 | B2 | | 4/2005 | Monforton | |
| 6,988,829 | B2 | | 1/2006 | Bareis | |
| 8,309,192 | B2 | | 11/2012 | Meseguer Huertas | |
| 2003/0232161 | A1 | | 12/2003 | Lin | |
| 2008/0103035 | A1 | * | 5/2008 | Kristel | B31B 70/00 493/480 |
| 2008/0234120 | A1 | | 9/2008 | Fort | |
| 2009/0114340 | A1 | * | 5/2009 | Bucco | B31F 1/2809 156/321 |
| 2009/0221408 | A1 | | 9/2009 | Cope | |
| 2019/0270269 | A1 | * | 9/2019 | Lederer | B65D 5/067 |
| 2020/0002059 | A1 | | 1/2020 | Spiewok | |

FOREIGN PATENT DOCUMENTS

| | | | | | |
|---|---|---|---|---|---|
| EP | 2441698 | B1 | | 4/2014 | |
| EP | 3399101 | A1 | | 7/2018 | |
| ES | 2204272 | A1 | | 2/2002 | |
| JP | 2005022655 | A | * | 1/2005 | |
| WO | WO-2011048545 | A1 | * | 4/2011 | B31B 70/00 |

* cited by examiner

RECYCLABLE COMPOSTABLE PAPER BAG

CROSS-REFERENCE TO RELATED APPLICATION

The application claims priority from U.S. patent application Ser. No. 17/005,967, filed Aug. 28, 2020, which application claims priority from Provisional Application entitled "Mesh Paper Bag," Ser. No. 62/893,345, filed Aug. 29, 2019, the contents of which are incorporated herein by reference in their entireties.

FIELD OF THE INVENTION

The present invention is directed to a paper bag. More specifically, the present invention is directed to a single-ply paper bag which is completely recyclable and compostable for filling with product including moisture rich product such as produce. The present invention is further directed to a process for producing and filling said paper bags with product including moisture rich product such as produce.

DESCRIPTION OF PRIOR ART

Paper bags are known to the industry for bagging produce, groceries, and the like. A standard paper bag for groceries and dry products is typically prepared from stock paper wherein the side and bottom closures have been glued together. Paper bags are well-known in the industry for this purpose. Typical paper bags (similar to grocery bags) are what are known as self-opening squares that are formed by gluing the seams with a traditional glue (such as Elmer's®-type glue). The glued seams of a paper bag are not sealed, they are glued and therefore the glued seams do not create a water/moisture-tight seal or a seal such that small particles will be maintained within the bag. Therefore, moisture leaving the packaged contents of the bag (such as produce) may react with a standard paper bag causing it to decompose and fail, often causing the produce to spill out of the torn bag. The moisture leaving the produce can also seep through the glued seams and cause the glued seams to fail. These glues have a high viscosity which requires significant time for them to dry and bond, making it impractical to fill them at the same time they are formed. Additionally, since the seams are glued and not sealed, small particles from the contents of the bag may be able to escape through the gaps in the seams where the glue does not seal the seams and air can infiltrate the interior of the package. Further, the gluing process must be completed on an unfilled bag. Therefore, traditional paper bags cannot be formed and filled at the same time. They must be formed and then once formed can be filled.

Therefore, many types of products are not suitable for packaging in a traditional glued paper bag. For example, produce and frozen food bags are typically not made of paper due to the significant moisture in the contents of the bag. Additionally, product with small particles would not be suitable for traditionally glued paper bags, as the small particles may not be fully contained in the bag due to the unsealed seams. Further, since traditional paper bags are formed and glued, then filled, this complicates the process of automated filling.

To counteract these problems, laminated polypropylene bags or fully plastic bags are typically used to bag product with small pieces/particles and produce: apples, potatoes, onions, pears, etc. These bags are either fully plastic or include a plastic internal liner to allow the seams to be fully sealed and keep small particles in and keep the moisture from the contents of the bag from causing the bag to fail. The exterior of the bag may be made from paper; thereby creating a 2-ply bag of paper and plastic. These bags do not require any glue or adhesive, the plastic is heat-sealed to itself create the seams. This creates a bag with seams that are fully sealed.

However, the inclusion of the plastic liner on the bag prevents the bag from being disposed of by way of recycling or composting. Therefore, these bags must be disposed with non-recyclable trash thereby adding significant waste to landfills. Retailers are making efforts to market goods in recyclable, compostable packaging. Further, a 2-ply bag requires additional production time and cost.

To create a single ply fully recyclable and compostable paper bag capable of fully sealed seams, it is optimal to heat-seal the seams, which requires applying a heat-activated adhesive to the paper and then heat-sealing the adhesive to itself. The only known use of heat-sealing paper products is the use in the microwave popcorn industry where heat-activated adhesive is used to secure the top seam of the popcorn bag. However, the adhesive used in popcorn bags is not a sealing adhesive; it is a semi-porous adhesive that is tacky at room temperature that essentially tacks the seam together, creating an easy to open seam that allows steam to escape. Therefore, the heat-sealed seam of the popcorn bag is not actually "sealed," is not water-tight, and does not form a strong enough bond to maintain the integrity of the seam with any significant force placed on the "seal". Further these seams are not tamper-resistant, in that once the adhesive is activated it becomes tacky and can be unsealed and resealed without the need for further heat activation. Therefore, the only known use of heat-activated adhesive on paper creates a tacky, semi-porous, easy to open, non-moisture resistant, weak closure that is not tamper resistant.

SUMMARY OF THE INVENTION

An optimal paper bag will be a completely (or 100%) recyclable and compostable single-ply paper bag with sealed seams which can withstand the moisture from produce and other products, maintain the contents of small particles within the bag, prevent additional air from infiltrating the interior of the bag, and be tamper-resistant/tamper evident. Ideally, such a bag would be capable of having a window or a covered opening so that produce can be viewed and readily identified. Ideally, such window or covered opening would be 100% recyclable (and compostable) and be sealed directly to the bag by adhesive without the need for additional reinforcement or additional plies of substrate materials. To create the optimal paper bag, the optimal adhesive for said paper bag will be heat-activated, capable of printing onto the paper of the bag in register on both sides of the paper, and form a 100% sealed seam when adhered to itself that is water-tight, tamper resistant, and maintains its integrity with product inside weighing up to 10 pounds (up to 4.6 kg).

The present invention is direct to a method for creating and filling a paper bag with a covered window cutout configured to withstand moisture from product contained therein. The method includes receiving a roll of calendared paper at a standard printing machine and printing, with the standard printing machine, an adhesive onto a surface of the roll of calendared paper in a predetermined pattern. The adhesive is applied in register. The predetermined pattern includes application of the adhesive to a border of a window to be cut out of the paper and a roll of printed calendared paper is created. The method further includes cutting and removing a window portion of the paper from prescribed positions along the roll of paper such that once removed the window is created within the adhesive applied border of the paper, positioning a window covering to cover each of the windows and extend to the adhesive applied borders, and heat sealing the window coverings along the roll of printed calendared paper to the printed calendared paper. The method further includes receiving the roll of printed calendared paper at an automated forming and filling machine to form and fill the roll of printed calendared paper to create individual bags filled with a product, forming a body of the bag by shaping the printed calendared paper and heat sealing the adhesive applied seams of the printed calendared paper to secure the body of the bag filling the bag by automatedly adding product to the bag, and repeating the steps performed by the automated forming and filling machine until the roll of printed calendared paper is transformed into a plurality of formed, sealed, and filled bags.

The present invention is further directed to a method for creating and filling a single ply paper bag configured to withstand moisture from product contained therein. The method includes receiving a roll of calendared paper at a standard printing machine and printing, with the standard printing machine, an adhesive onto a surface of the roll of calendared paper in a predetermined pattern. The adhesive is applied in register and creates a roll of printed calendared paper. The method further includes receiving the roll of printed calendared paper at an automated forming and filling machine to form and fill the roll of printed calendared paper to create individual bags filled with a product, forming a body of the bag by shaping the printed calendared paper and heat sealing the adhesive applied seams of the printed calendared paper to secure the body of the bag, filling the bag by automatedly adding product to the bag, and repeating the steps performed by the automated forming and filling machine until the roll of printed calendared paper is transformed into a plurality of formed, sealed, and filled bags.

The present invention is further directed to a paper bag configured to withstand moisture from produce contained therein. The paper bag has a body, formed from a single ply calendared paper formed into a cylindrical shape with a seam formed along a length of the cylindrical shape which is made to be sealed with an adhesive applied, in register, to the paper. The bag also has a top that is made to be sealed with the adhesive applied, in register, to the paper. The bag also has a bottom that is made to be sealed with the adhesive applied, in register, to the paper. The bag also has adhesive that is printed onto the calendared paper of the bag in a predetermined pattern prior to forming the bag with a standard printing machine. The adhesive is applied to the calendared paper in register and is activated by heat sealing and adhering a portion of the paper with printed adhesive to a second portion of the paper with printed adhesive in a prescribed pattern to form the paper bag such that adhesive is sealed to adhesive.

The present invention is directed to a completely recyclable and compostable bag for use with produce, dry goods, and other goods. The bag is a single-ply paper with heat-sealed seams that are resistant to destruction from moisture, are fully sealed to prevent small particles from leaking out or additional air from infiltrating the interior of the bag, and are tamper evident/resistant. The term “produce” is used to mean products such as apples, potatoes, onions, pears and other fruits and vegetables. While produce is contemplated, the bag can be used to contain virtually any product and the use of produce as an example should not be considered limiting.

The present invention is further directed to a completely recyclable and compostable bag with sealed seams which includes a visual indication on the side of the bag to identify the contents of the bag. The indication is typically in the form of a window which is covered by a recyclable and compostable scrim or screen of material to prevent the bag contents from spilling out of the window. Preferably, the bag will be constructed of calendared virgin fiber paper of sufficient weight to contain product weighing up to 10 pounds (up to 4.5 kg).

The present invention is further directed to a process for printing a proprietary water-based heat-activated adhesive in registration on both sides of the paper where the bag is to be formed and sealed on existing automated plastic bag equipment later. Use of the proprietary adhesive, and printing that adhesive in register on both sides, allows paper substrates to be sealed on existing bag making equipment designed for plastic substrates. Before this process, paper was not able to be used on existing plastic bag equipment without the paper being plastic coated, causing the bag to be unsuitable for recycling or composting.

The present invention is further directed to a process for forming and filling the bag from a roll-stock of paper. The process comprises, unrolling the paper to a flattened plane, applying a heat-activated adhesive to the paper in a prescribed pattern such that the adhesive is applied only to the area of the paper that will form the sealed seams of the bag and, optionally, to an area of the paper designated as a window opening. If the bag includes a window opening, the window opening is cut out within the area of applied heat-activated adhesive and a covering to the window is applied such that the border of the covering overlaps the heat-activated adhesive. Optionally, a recyclable, compostable patch can be placed around the window such that the patch covers the edge of the screen and the heat-activated adhesive to form a border for the window. The patch and screen cover to the window, if present, are adhesively sealed to the paper by heat activation. The bag can then be filled and formed on any already existing automated forming and filling machine designed to form and fill plastic bags and plastic-lined paper bags. The machine used will depend on the size of bag to be formed and the product to be filled into the bag. Further, it should be understood that the bag may be formed without filling the bag simultaneously and leaving one seam open for later sealing after the bag has been filled.

One method of assembling the bag includes using a top-fill automated forming and filling machine and forming the adhesive applied paper around a cylinder to create a tube of paper such that the heat-activated adhesive edges of the paper overlap, heat sealing the overlapped head-activated adhesive edges of the paper into a tube, automatedly filling the tube with product, heat sealing the bottom edge and top edge of the product-filled tube to form an enclosed bag with product therein.

Advantageously, the above processes allows for the creation of a completely (100%) recyclable and compostable bag made of single-ply paper, water-based adhesive, and water-based printing ink with sealed seams that is resistant to moisture and does not transfer adhesive to the contents of the bag. Through the use of the proprietary adhesive, the adhesive can be printed in precise position on the paper using a printing press and then heat sealed to itself. This simplifies the process of applying the adhesive to the paper and increases the precision of the application. This is unlike the traditional paper bag making processes which use a glue that cannot be "printed" onto the paper or applied using a printing press, which complicates the application of the adhesive to the paper and the precision of the application. This is further unlike traditional heat-sealed bags, which require plastic to adhere the seams in the heat-sealing process and therefore also do not have adhesive "printed" onto the bag substrate.

Further advantage is achieved by the above invention through the application of adhesive in register on both sides of a substrate which allows for manufacture of various paper bag designs on automated plastic packaging equipment without the use of plastic. The application of adhesive in register will allow the bag to include additional substrates such as scrim, glassine, or paper patch laid down in register to allow for a single ply bag which allows this material to run on automated plastic equipment. This creates a 100% recyclable and compostable single-ply paper bag using already existing equipment and simplifies the process.

The process and resulting product minimize the material required for creating the bag, even in options that include the window due to the single-ply construction. Further, the combination of the proprietary adhesive with the paper allows the adhesive to be "printed" in register on the paper, which enables the bag to be assembled and filled on already existing automated plastic equipment. The result is 100% complete automation for packaging product in a completely recyclable and compostable bag capable of withstanding high moisture contents such as produce. Retailers offering goods packaged in paper bags/pouches using our process will greatly improve their environmental scorecard and attract environmentally conscious consumers to their stores.

The objects and advantages of the invention will appear more fully from the following detailed description of the preferred embodiment of the invention made in conjunction with the accompanying drawings.

DETAILED DESCRIPTION OF THE INVENTION

This invention is directed to a novel paper bag and to a process for producing, assembling, and filling the paper bag. As described above, the bag must have two primary qualities. First, the bag must have heat-sealed seams, capable of containing its contents without tearing, degrading or splitting at the seams, even if the contents have some moisture on them and/or release moisture. Second, the bag must be fully recyclable and compostable. Optionally, the bag will have a covered window for viewing the contents such that the window covering is adhered by adhesive directly to the paper without the need to reinforce the seal, while maintaining a single-ply construction of the bag. Ideally the covering will be a mesh/scrim material that is coated with a polyvinyl acetate adhesive, which is known in the industry, and is able to be heat-sealed directly to the adhesive printed on the paper that borders the window cutout of the bag without additional reinforcement of materials. However, other materials are contemplated provided they are 100% recyclable and compostable.

Figure 1:
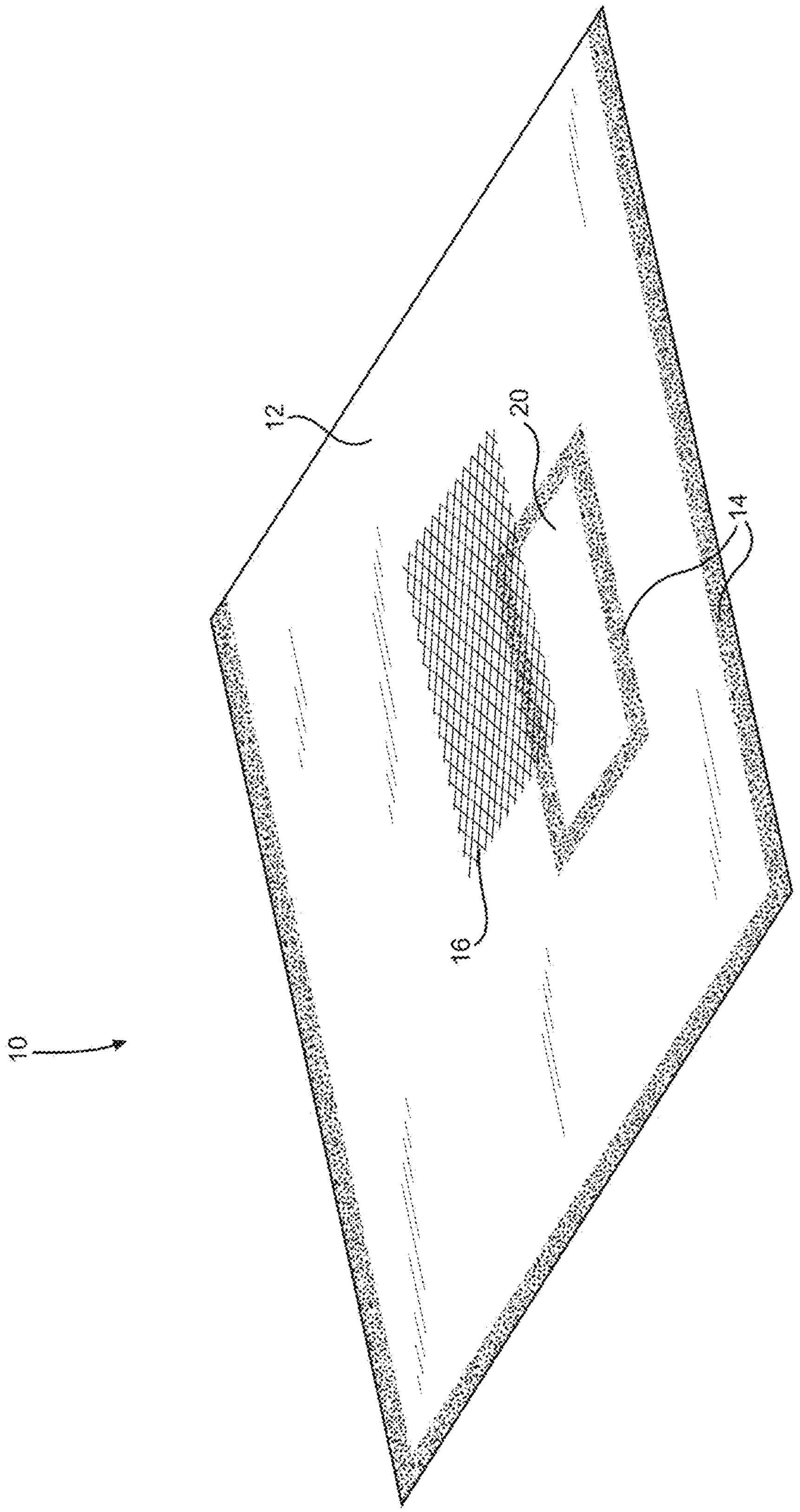
FIG. 1 is a top view of the deconstructed bag of the present invention illustrating the optional mesh covered window cut out.

The invention is directed to a paper bag 10 to be filled with product. Examples of such product may include, but are not limited to produce, dry goods, and the like. Referring to FIG. 1, the paper bag 10 is constructed from single-ply paper 12, a water-based adhesive 14, and optionally, and a window covering 16 applied to a window cut out 20 in the paper 12. The window covering 16 may or may not have a paper patch 18 adhered to the perimeter of the window covering 16 to form a border for the window covering 16 (illustrated in FIG. 2). The paper bag 10 is 100% recyclable (and compostable), single ply, withstands moisture from the contents contained therein, and is capable of being assembled and filled on existing automated machines that are used for filling and forming plastic bags and/or 2-ply plastic lined paper bags.

Figure 2:
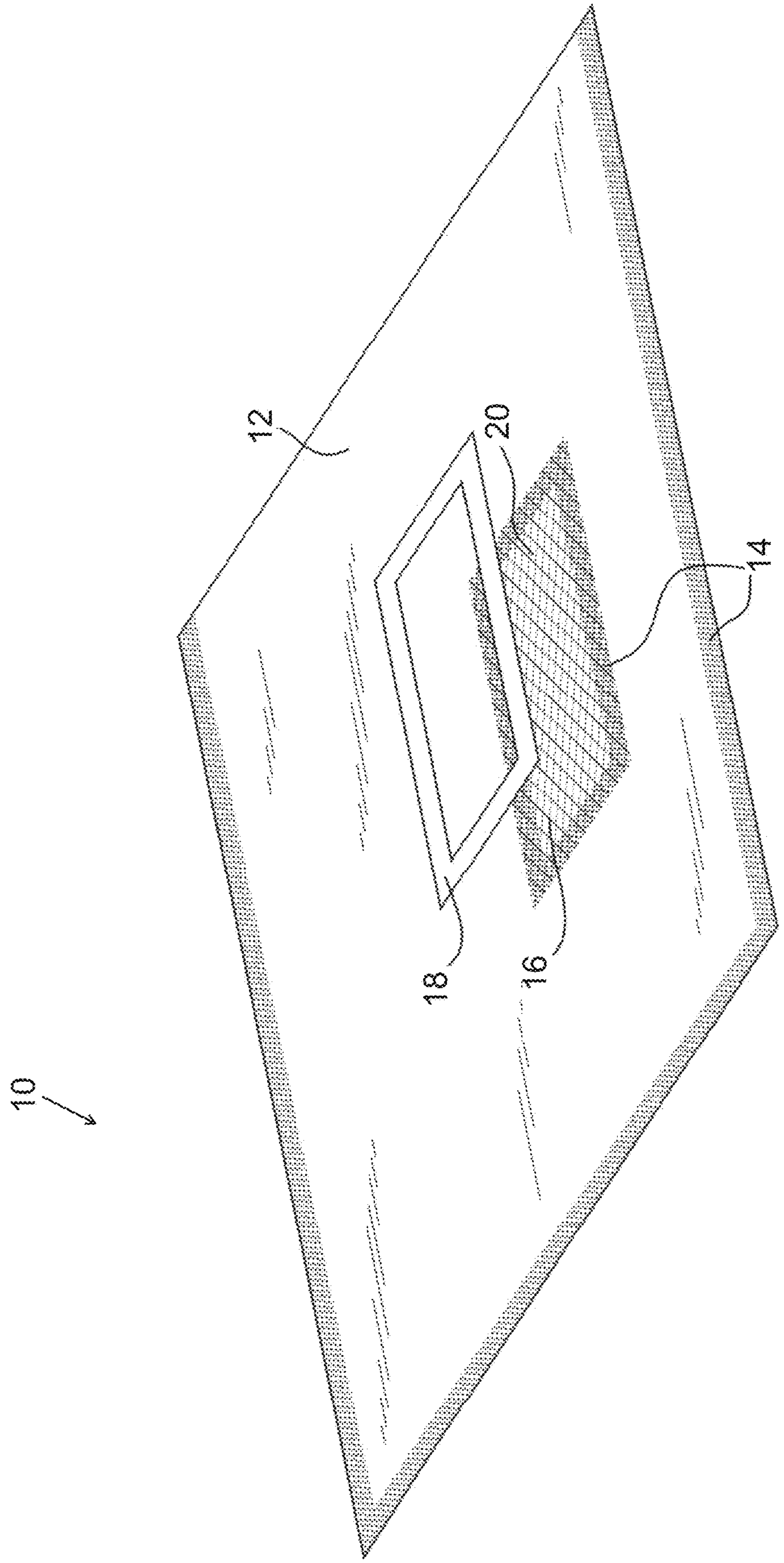
FIG. 2 is a top view of the deconstructed bag of the present invention illustrating the optional mesh covered window cut out with optional paper patch.

Paper 12:

Continuing to refer to FIGS. 1 and 2, the preferred paper 12 for the bag 10 of the present invention is a single-ply virgin fiber that has been calendared. While not required, virgin fiber is preferred as it contains longer cellulosic fibers which provide added flexibility and strength. Calendaring is a term of art known to the paper industry and describes the compression of the paper sheet to press the fibers closely together making a denser fiber structure. Calendared paper is known to the industry. While virgin fiber paper is preferred for its durability, recycled calendared paper (containing up to 100% recycled content) would also be suitable for the bag 10 and process. Preferred examples of acceptable calendared paper include Ahlstrom Munksjö's 50 NATL MF B&U KFT 38 AND 40 NATL MF B&U KFT 38 (Helsinki, Finland). The ideal paper 12 product will be provided on a roll that can be processed through an adhesive printing machine 30 (FIG. 4) and a cut and scrim machine 50 (FIG. 5), rerolled and delivered to the automated forming and filling machine 70 (FIGS. 6 and 7) as a roll of paper that has had the adhesive 12 applied, optional window cut out 20 cut, and the window covering 16 applied (with optional paper patch 18). The weight of the paper 12 depends on the product being filled into the bag. The paper must be of sufficient weight to withstand the filling of product in the bag and maintain the product in the bag throughout its sales cycle. However, for use on already existing automated forming and filling machines and for optimal results in printing the adhesive onto the paper, the paper should be within 30-60 pounds per 3000 square feet (13-28 kg per 279 square meters), preferably 40-50 pounds per 3000 square feet (18-23 kg per 279 square meters). The size of the roll can be any size suitable for processing on the automated forming and filling machine and to create the desired sized bag. Typical dimensions for the roll of paper 12 that is intended for typical produce bags to be formed and filled on traditional automated forming and filling machines may be an outer diameter of approximately 14-60 inches (approximately 35-154 cm), approximately 13-30 inches (approximately 33-76 cm) wide with approximately 3,500-35,000 lineal feet (approximately 1066-10668 lineal meters) on a roll. It should be understood that the above is merely an example of typical dimensions and that the roll of paper can be nearly any size required to accommodate the bag to be created and the automated machine to be used for forming the bag.

Advantageously, the dense fiber structure of calendared paper 10 enables the adhesive 14 to be printed on the surface of the paper and not soak into the paper structure, which is critical to the bag making process of the present invention as the bag seams are created by sealing adhesive to adhesive. If the adhesive soaks into the paper 12, the ability to bond the paper 12 together is compromised, which would reduce package strength when loading the bag with material and maintaining the seal of the bag 10. The combination of calendared paper 12 and adhesive 14 is also important when bonding the window covering 16 to the paper 12, again as the adhesive applied to the border of the window cut out 20 is adhered to adhesive applied to the border of the window covering 16. The use of virgin calendared paper in combination with the adhesive printed on the paper is novel to the industry. The window covering 16 has a bonding agent that, when coupled with the adhesive 14 applied to the calendared paper 12, allows the two materials to securely bond together without the requirement of a 2-ply construction, plastic coating, or additional plies of paper. Until the process of the present invention, single ply paper could not be used on automated forming and filling machines known in the industry to produce packaging without the use of plastic coatings, which renders the packaging unrecyclable and increases prices and complexity of the bag.

Adhesive 14:

The adhesive for the present invention must satisfy certain requirements. The adhesive must be a 100% recyclable (and compostable) heat-activated adhesive able to heat seal with similar substrates with a short dwell time in the temperature range of about 350-450 degrees Fahrenheit (about 176-234 degrees Celsius) such that it can be formed and filled on already existing form and fill machines for plastic lined bags. When adhesive is adhered to adhesive, it must create a water-tight bond resistant to moisture and opening at least when maintained in temperatures below 150 degrees Fahrenheit (65.6 degrees Celsius). It also must be able to be “printed” in register on calendared paper 12 with a standard printing machine similar to the way ink is printed onto paper. This allows the adhesive to be precisely located on the paper and allows the adhesive 14 to dry on the paper 12, similar to print ink The adhesive must also be 100% recyclable and compostable, (i.e. water based) and strong enough to adhere calendared papers in the weight range listed above and be sufficient to withstand a significant amount of weight, e.g., up to 10 pounds of weight (up to 4.5 kg), without unsealing.

Accordingly, the adhesive 14 is preferably a water-based, heat-activated polyvinyl acetate with a low viscosity for polyvinyl acetates that forms a water-tight bond when bonded to itself. Ideally, the adhesive has a viscosity of 30 seconds to 50 seconds through a Zahn #2 cup (approximately 70-125 centipoise) that will dry in less than 1 second on virgin calendared paper of weight 30-60 pounds per 3000 square feet (13-28 kg per 279 square meters) when printed onto the paper at a thickness level of approximately between 0.0005 inches to 0.001 inches (approximately 0.0127 mm to 0.0254 mm) that when heated between approximately 350 degrees Fahrenheit to 450 degrees Fahrenheit (approximately 176 degrees Celsius to 232 degrees Celsius) will bond with itself within 100 milliseconds to 350 milliseconds with a tensile strength of approximately 4,000 psi at temperatures below 150 degrees Fahrenheit (approximately 27.6 M Pa at temperatures below approximately 65.6 degrees Celsius). An exemplary type of adhesive for the present invention is identified as PaperLock™ from Cattie Adhesives (Quakertown, PA).

Advantageously, “printing” the adhesive 14 onto the paper 12 allows for the precise application of the adhesive 14 on the paper 12 such that the adhesive 14 can be printed in register on both sides of the paper 12. Once the paper 12 is “printed” with adhesive 14 and rewound into a roll, the paper 12 can later be further processed in a different machine to activate the bonding of the adhesive 14 by heat. The ability to print on both sides of the paper is important in that the seams of the bag are created by heat-sealing adhesive applied portions of the paper together, rather than an adhesive applied portion of paper to a non-adhesive applied portion of paper. This creates a water-tight bond of sufficient strength to maintain product of up to 10 pounds (up to 4.5 kilograms). Further, the use of heat-activated adhesive is substantially unknown of in combination with paper products. As indicated above, one known use is for sealing microwave popcorn bags; however, unlike the adhesive used in the popcorn bag, the adhesive in the present invention is configured to form a strong water-tight bond when the adhesive is adhered to itself and printed onto the paper 12. Further, unlike the adhesive used for “sealing” popcorn bags, the adhesive in the present invention is configured to be printed in register on both sides of the paper. The adhesive of the present invention is configured to be printed on and strongly adhere to calendared uncoated 100% recyclable and compostable paper, which is unlike the paper used in popcorn bags which use a coated paper to resist oil.

Printing Ink (not Pictured):

Optionally, the bag 10 can be printed with indicia in a manner known to the art. The printer ink must be water-based and 100% recyclable and compostable. Such inks are well known to the industry.

Window Covering 16:

If the bag 10 of the present invention includes a window cut out 20 on one or more sides of the bag through which to view the contents, it is desirable to seal the window cut out with a relatively see-through material to allow the contents to be viewed and to prevent the contents from spilling out of the bag. The material is typically a viscose fiber mesh screen, known as “scrim”. The window covering 16 is a 100% recyclable and compostable wood-based product which has a polyvinyl acetate adhesive applied to the surface for adhering the window covering 16 to the above referenced adhesive 14 printed on the perimeter of the window cut out 20. Optionally, the window cut out 20 can be covered with a “glassine” window, a fiber, i.e., paper, based material which is relatively transparent or translucent for viewing the contents. The window covering 16 is attached to the paper 12 by heat activating the adhesive 14 applied to the perimeter of the window cut out 20 and the adhesive applied to the window covering 16. Window covering 16 is well known in the industry and any type of known window covering 16 can be used provided it is 100% recyclable and compostable wood-based/paper-based material with a 100% recyclable and a compostable polyvinyl acetate adhesive applied to the window covering 16. Importantly, the window covering 16 can be adhered to the paper 12 using the above described adhesive 14 without the need for additional reinforcement of the seal or additional plies of material to sandwich the window covering 16 between.

The window covering 16 material may be supplied in a number of forms such as a sheet or a roll where the window covering 16 is processed to be positioned over the window cutout 20 of the paper 12 and the window covering 16 is cut to precisely fit the window cutout 20 and extend precisely to the edge of the adhesive 14 applied to the perimeter surrounding the window cut out 20. This precision allows for the use of minimal window covering material and minimizes cost and waste.

Patch 18:

Referring to FIG. 2, if desired, a rectangular patch of 100% recyclable and compostable paper, such as the paper 12 described above, can be used over the perimeter of the window covering 16 or glassine window to further secure the window covering 16 to the paper 12. The surface of the patch to be adhered to the window covering will be printed with the adhesive described above.

Figure 3:
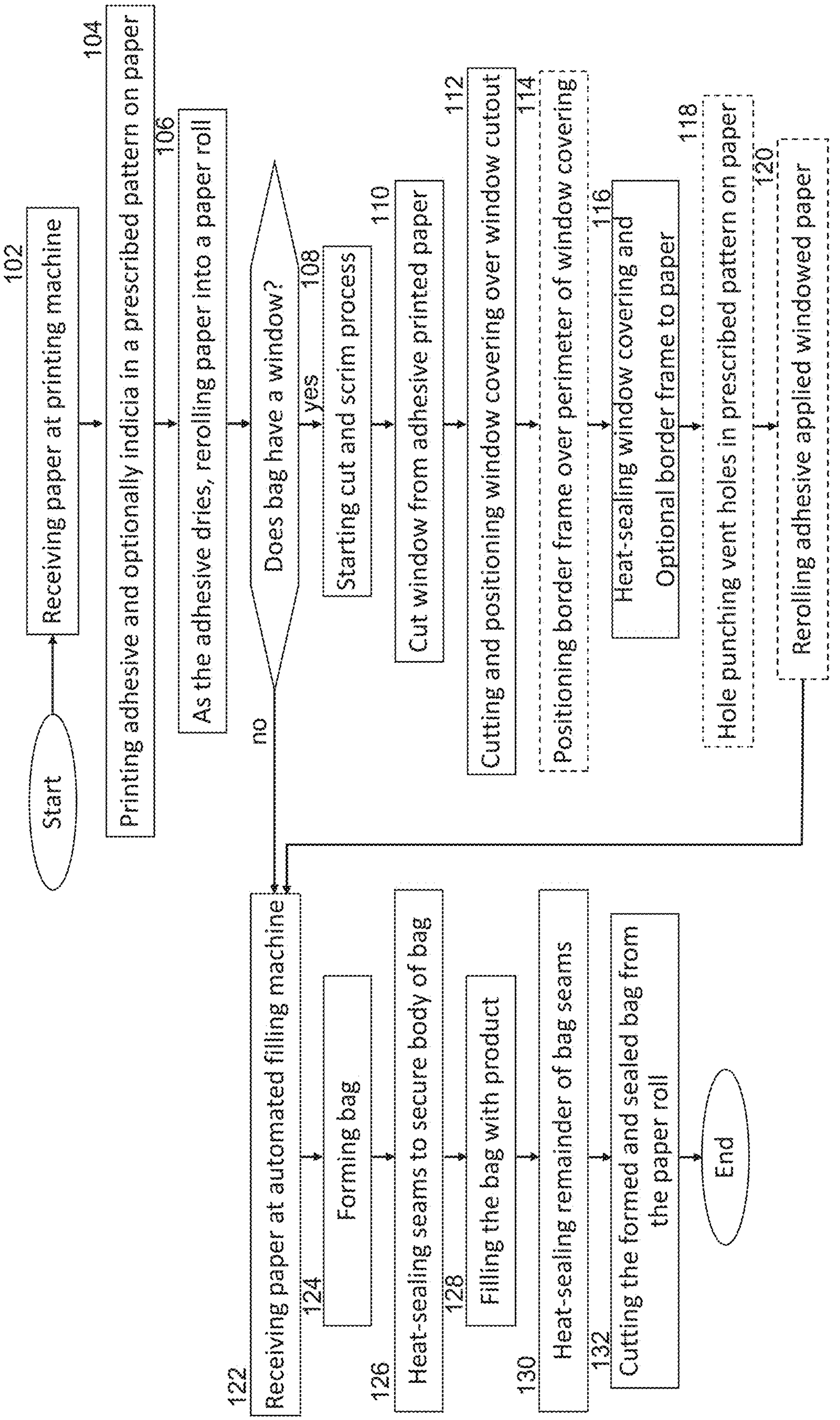
FIG. 3 is a flow chart for the process of making and filling the bag of the present invention.

Machines and Process:

The invention is further directed to the process for creating the bag 10 and filling it with product. FIG. 3 depicts a flowchart for a process 100 for manufacturing, assembling, and filling the 100% recyclable and compostable paper bag suitable for storing produce as described above.

First, the adhesive is printed onto the roll of paper in the prescribed pattern using a standard printing machine to allow the adhesive to be printed in register on both sides of the paper. It should be understood that the prescribed pattern will differ depending on the size and type of bag that is being produced. The steps listed below are a fully automated process for printing the adhesive onto the paper using a standard printing machine.

Figure 4:
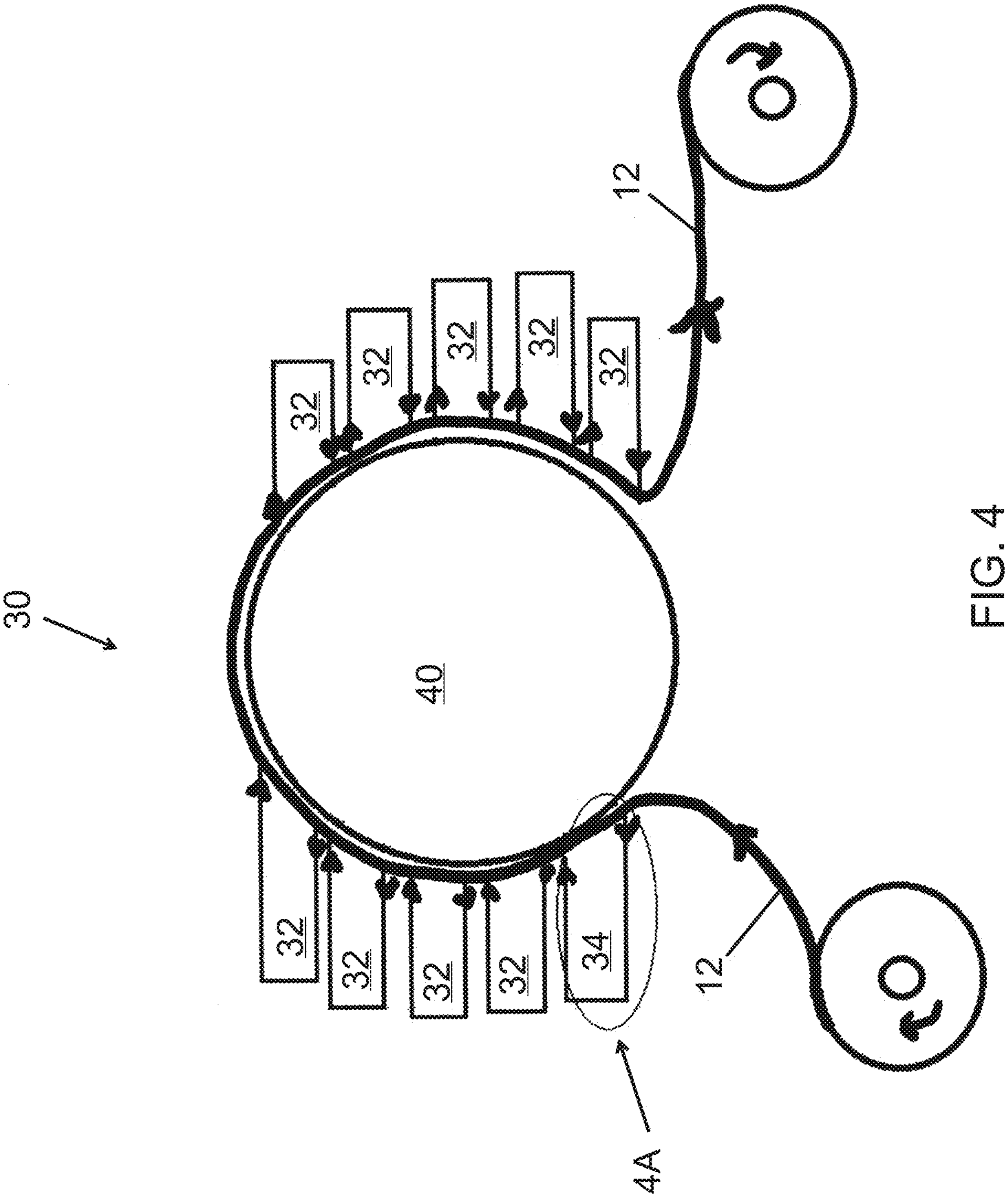
FIG. 4 is a view of an adhesive printing machine illustrating the process of printing adhesive onto paper of the present invention.

Referencing FIGS. 3 and 4, at step 102, a roll of calendared paper, as described previously, is positioned on an intake roller at one end of a standard printer machine for printing indicia and other inked printing on the paper and for printing the adhesive onto the paper. Advantageously, the same printer can be used to print both the adhesive and the inked matter onto the paper with a single pass through the printing machine.

Printers are known to the art for printing indicia and the same on calendared paper similar to the calendared paper described herein. A representative example of a printer used for such a process is the Legacy Flexo model number PCMC Fusion C (Green Bay, WI) and similar models from Comexi, Fischer Krecke and W&H. To enable a standard printing machine to print the adhesive (rather than ink), the adhesive describe above was formulated to work with a specially designed anilox roll capable of laying down the prescribed about of adhesive with the described viscosity onto the paper in register to meet the sealing requirements of the bags being sealed. The specially designed anilox roll contains a higher volume of billion cubic microns than a traditional anilox roll to accommodate the application of the adhesive due to its viscosity and chemical makeup. The preferred anilox roll has a volume of 25 billion cubic microns (BCM) with a 110 line count and allows for flexographic printing of the adhesive. This combination allows the adhesive to be applied in register at the specified thickness without the use of gravier printing. Gravier printing is much more expensive and an uncommon feature on standard printers. Whereas flexographic printing is less expensive, more widely available in standard printers and is available to print on wider papers. By replacing the ink tank with an adhesive tank filled with the above described adhesive and using the above preferred anilox roller, uncoated paper can be processed on standard printing machines to produce paper printed with a prescribed pattern of adhesive and, optionally, with a prescribed pattern of indicia. For example, in a standard 10 color press machine, two colors would be replaced with adhesive tanks and anilox rolls, thereby allowing 8 colors and the adhesive to be printed simultaneously. The below process enables the machine to mimic virtually any existing seal used in plastic packaging on a 100% recyclable and compostable paper substrate.

Figure 4A:
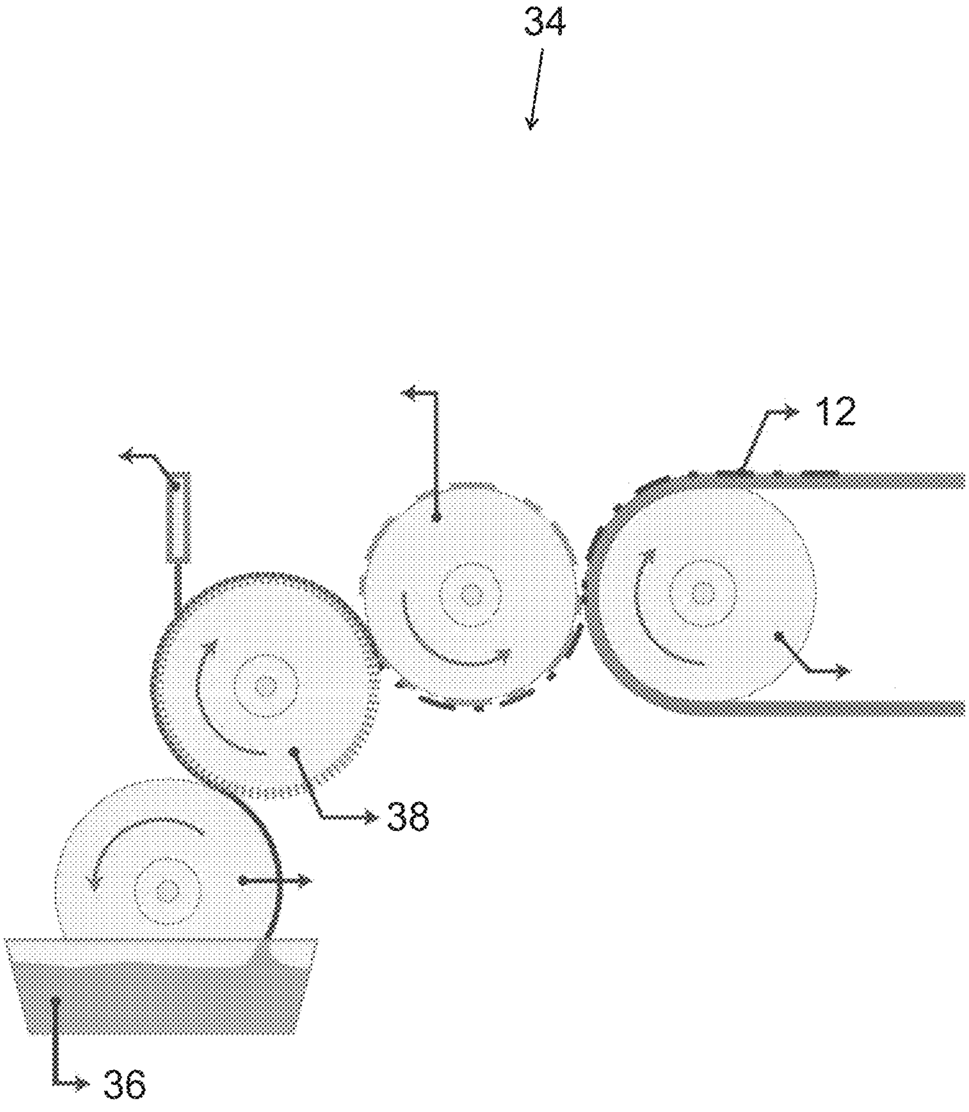
FIG. 4A is an enlarged portion of section 4A in FIG. 4 illustrating the process of printing adhesive onto paper of the present invention.

At step 104, the calendared paper is run through the printer machine while the printer machine applies, in register, the adhesive to the calendared paper and printed indicia, if desired. The adhesive and/or printed indicia can be printed on one or both sides of the paper, without the need to rerun the paper roll through the printer machine. The calendared paper is unrolled from the roll and passed through the printer to lay down adhesive along with artwork and graphics in a prescribed pattern. For example, as illustrated in FIG. 4, a standard 10 color printing machine 30 has 10 printing units 32 around an impression cylinder 40, each printing unit 32 is able to print a different color, further one or more of the printing units 32 can be replaced with one or more adhesive printing units 34 adapted to print the adhesive 14 onto the paper 12 similar to how ink is applied by a printing unit 32. As illustrated in FIG. 4A, the paper 12 enters the adhesive printing unit 34 and is fed through an adhesive tank 36 and over the preferred anilox roller 38 to apply the adhesive 14 in the prescribed pattern to the paper 12.

Due to the specially designed adhesive and the specially designed anilox roll, the adhesive is applied in the same manner as the printer ink. This operation is novel in that heretofore a printer machine has never been previously used to apply adhesive to paper in a similar manner as printer ink where the adhesive forms a water-tight structured bond with the paper and, once heated, forms a water-tight structured bond with itself. Prior to application, the adhesive has similar characteristics to printer ink thereby allowing the adhesive to be applied in the same manner as printer ink. The adhesive is applied by the printer machine in a predetermined pattern to seam locations on the paper as well as the border location where a viewing window will eventually be stamped out on the wall of the bag of the present invention (provided the current bag production calls for a window).

Advantageously, by using a printing machine to “print” the adhesive onto the paper in a manner similar to printing ink onto paper, the placement of the adhesive can be predetermined and be applied to precisely the locations desired. Through the use of the above disclosed adhesive, which is configured to print like traditional printer ink, and the preferred anilox roll, a standard printing machine can be used to apply the adhesive. Unlike prior art where the entire sheet/roll of paper must be coated with a layer of plastic to adhere the seams of the bag, the adhesive here is applied only to the locations that will form the seal thereby creating a single ply paper bag. Further, traditional plastic-coated paper bags require two machines and steps to print indicia on the paper and then to coat the paper with the plastic. Whereas the above process enables the adhesive and the indicia to be printed on the paper using a single printing machine and a single step. Thusly, saving time and cost to the production of the bag.

At step 106, the adhesive and print is allowed to dry on the printed calendared paper and the printed calendared paper is then re-rolled to a follow up roll stock of paper for the next operation. Ideally, the printing machine runs between approximately 500-800 feet per minute (approximately 152 to 243 meters per minute). Both the adhesive and the ink are designed to dry at this rate of printing thereby allowing the printing machine to continuously print on the roll of paper and the adhesive and ink to dry without stopping. Alternatively to rerolling the paper, the paper may immediately start the cut and scrim process listed below (if the bag is designed with a window cutout).

It should be understood that steps 102 through 106 are a continuous operation until the roll of calendared paper has been fully printed with adhesive and ink and rerolled. For example, step 104 will be occurring at a point along the roll of calendared paper simultaneously to step 106 at a corresponding point along the roll of calendared paper. FIG. 4 and FIG. 4A illustrate the performance of steps 102 through 106 on an exemplary printing machine.

Next, if the bag is to contain a window, the "cut and scrim" process occurs such that the window is cut out of the prescribe positions on the paper and the window covering is positioned and adhered to cover the window cut out using the applied adhesive described in the steps above. If the optional border is to be used, the border is then placed over the window covering and adhered to the paper together with the window covering using the adhesive.

Referring to FIG. 3, at step 108, the cut and scrim process is started on the printed roll of calendared paper 12.

Figure 5:
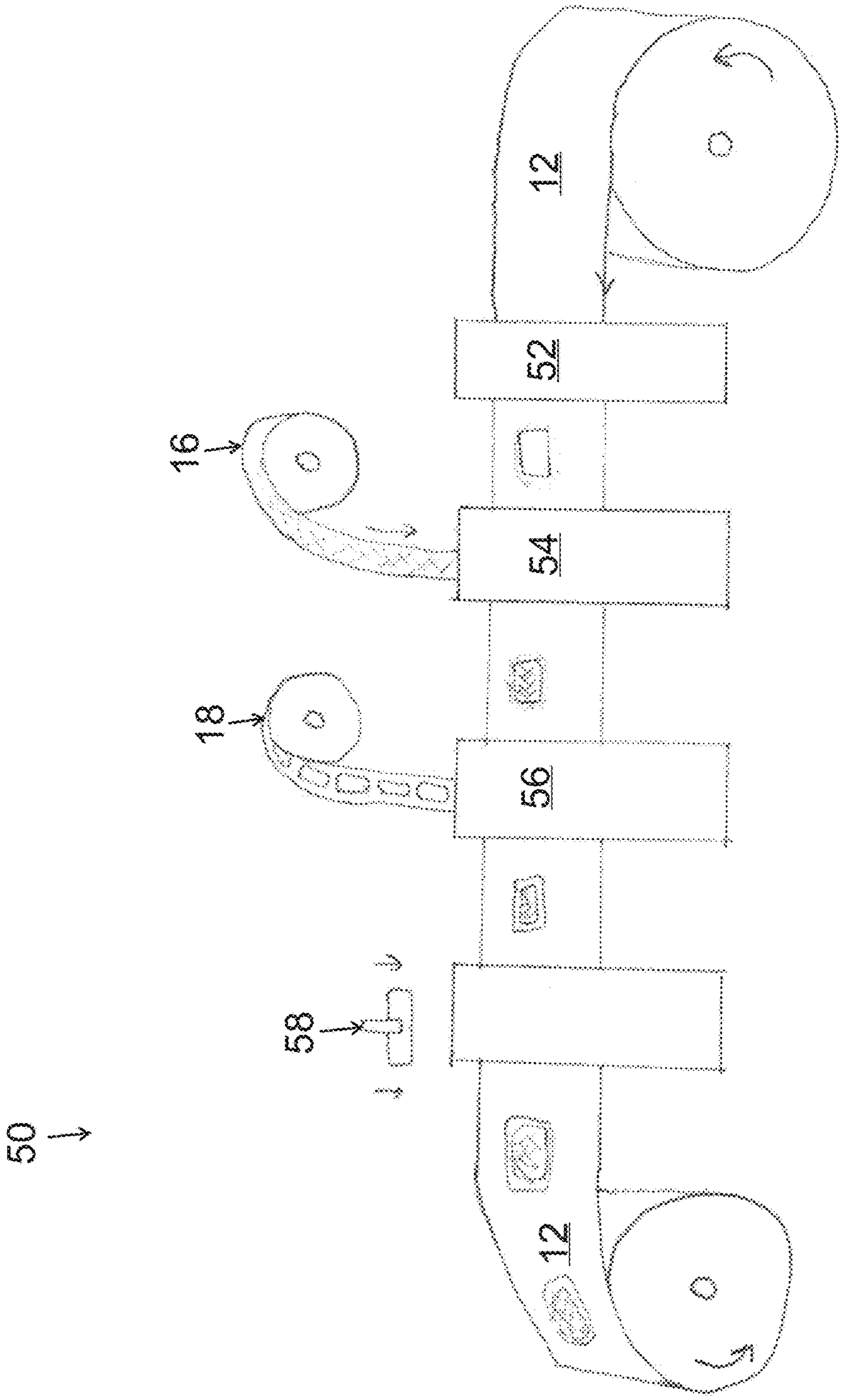
FIG. 5 is an interior side view of a cut and scrim machine illustrating the optional process of creating the window cutout and application of the scrim of the present invention.

At step 110, the window cut outs 20 are removed from the prescribed locations along the roll of printed calendared paper 12. The windows are strategically cut from the paper such that the windows are now bordered by dry adhesive. For example, as illustrated in FIG. 5, when using a cut and scrim machine 50, the paper 12 passes through a window cutting device 52 that cuts the window cutout 20 in reference to the printed adhesive 14 surrounding the border of the window cutout 20.

At step 112, the window covering 16 is cut to the precise size and shape needed to cover the window cutout and positioned over the window area such that the border of the window covering extends from the window and is placed over the dry adhesive. The window covering is as described above. For example, as illustrated in FIG. 5, when using a cut and scrim machine 50, the window covering 16 is fed into the cut and scrim machine 50 and a scrim positioning and cutting device 54 cuts the window covering 16 to the precise size needed for the prescribed window pattern and positions the window covering 16 over the window cutout 20 such that the window covering is aligned with the adhesive 14 applied to the perimeter of the window cutout 20.

At optional step 114, if desired, a border paper gasket patch framing the window can be placed over the border surrounding the window and over the edge of the window covering which is adjacent the adhesive. However, it should be understood that the present invention does not require (for strength or for functionality) a border or second ply of substrate to adhere the window covering to the bag. For example, as illustrated in FIG. 5, when using a cut and scrim machine 50, the border material 18 is fed into the cut and scrim machine 50 and a border positioning and cutting device 56 cuts the border covering 16 to the precise size needed for the prescribed window pattern and positions the border 18 over the window covering 16 such that the border 18 is aligned with the window covering 16.

Preferably, the window covering and optional patch will be adhered to the interior of the bag to provide for greater strength of the seal. However, it should be understood that the window covering and the optional patch could be positioned to be adhered to the inside of the bag or the outside of the bag, depending on where the adhesive is applied and what the prescribed bag pattern calls for. However, if the optional patch is used, it will be positioned over the window covering and therefore adhered to the same side of the bag that the window covering is adhered to.

At step 116, a heating element is applied to the prescribed location on the paper to bond the adhesive printed on the paper and the adhesive applied to the window covering at the location of the window. If optional step 114 is used, the heating element can be applied to the patch and border of the window. The window covering which is sandwiched between the calendared paper and the patch is adhered to the paper and the patch with the adhesive applied to the paper. The patch therefore forms a reinforcing border. For example, as illustrated in FIG. 5, when using a cut and scrim machine 50, the paper 12, with the positioned window covering 16 and optional border 18 is fed into the heat sealing device 58 and, at the prescribed location, the window covering 16 and optional border 18 are heat sealed to the paper.

It should be understood that steps 112 and 116 are dissimilar to prior methods of attaching a window covering to a window opening in plastic-coated paper bags in that the window covering in the present invention is attached directly to the single ply paper substrate, whereas windows in traditional plastic-coated paper bags simply have the paper portion of the two ply bag removed and utilize the plastic lining for the window and therefore, there was no need to position or attach a window covering.

At optional step 118, if desired, vent holes may be punched in prescribed placements along the roll of printed paper.

At step 120, the finished roll stock of paper 12 is rerolled for the next operation and the cut and scrim process is completed.

It should be understood that steps 108 through 120 may occur in order or may occur continuously and simultaneously for processing an entire roll of printed calendared paper. It should further be understood that steps 108 through 120 only occur if the bag being produced contains a window cut out and window covering.

While the above process can be accomplished manually or semi-automated through the use of several machines, it is preferable that the cut and scrim process be accomplished on a single automated cut and scrim machine. FIG. 5 illustrates a cut and scrim machine 50 performing the automated cut and scrim process as described in the steps above.

Advantageously, in the present invention, the scrim can be adhered directly to the single ply paper without the need for reinforcement or a second layer in which to sandwich the window covering between, all using the above described, pre-applied adhesive. As indicated above, this process of forming a covered window opening in a bag is a novel process and; therefore, cut and scrim machines are not known in the art. The cut and scrim machine 50 may be configured to heat seal the window covering 16 and optional patch 18 in unlimited different window configurations of different shapes, sizes and positions and placement in unlimited shapes and styles of bags. Ideally the window may be 5% to 25% of the overall surface area of the bag. A cut and scrim machine 50 capable of performing the necessary steps of the process required for the present invention is Model Number 750 WPM produced and manufactured by Hudson-Sharp Machine Co. (Green Bay, WI).

Finally, the bag is to be formed and filled. It should be understood that there are many embodiments and ways the roll of paper can be formed into bags and filled. The present invention contemplates and is specially designed to use pre-existing automated forming and filling machines that traditionally require plastic-lined paper in order to form the bag. In another embodiment, the bag may be formed on automated form and fill machines, but not filled or sealed on the top seal. The bag may then later be filled and the top sealed. The process is the same, except no product is initially filled into the formed bag by the automated forming and filling machine and the top is not sealed. Below are the steps for forming and filling the bag of the invention using a vertical automated forming and filling machine. This is merely one embodiment and should not be considered limiting.

Figure 6:
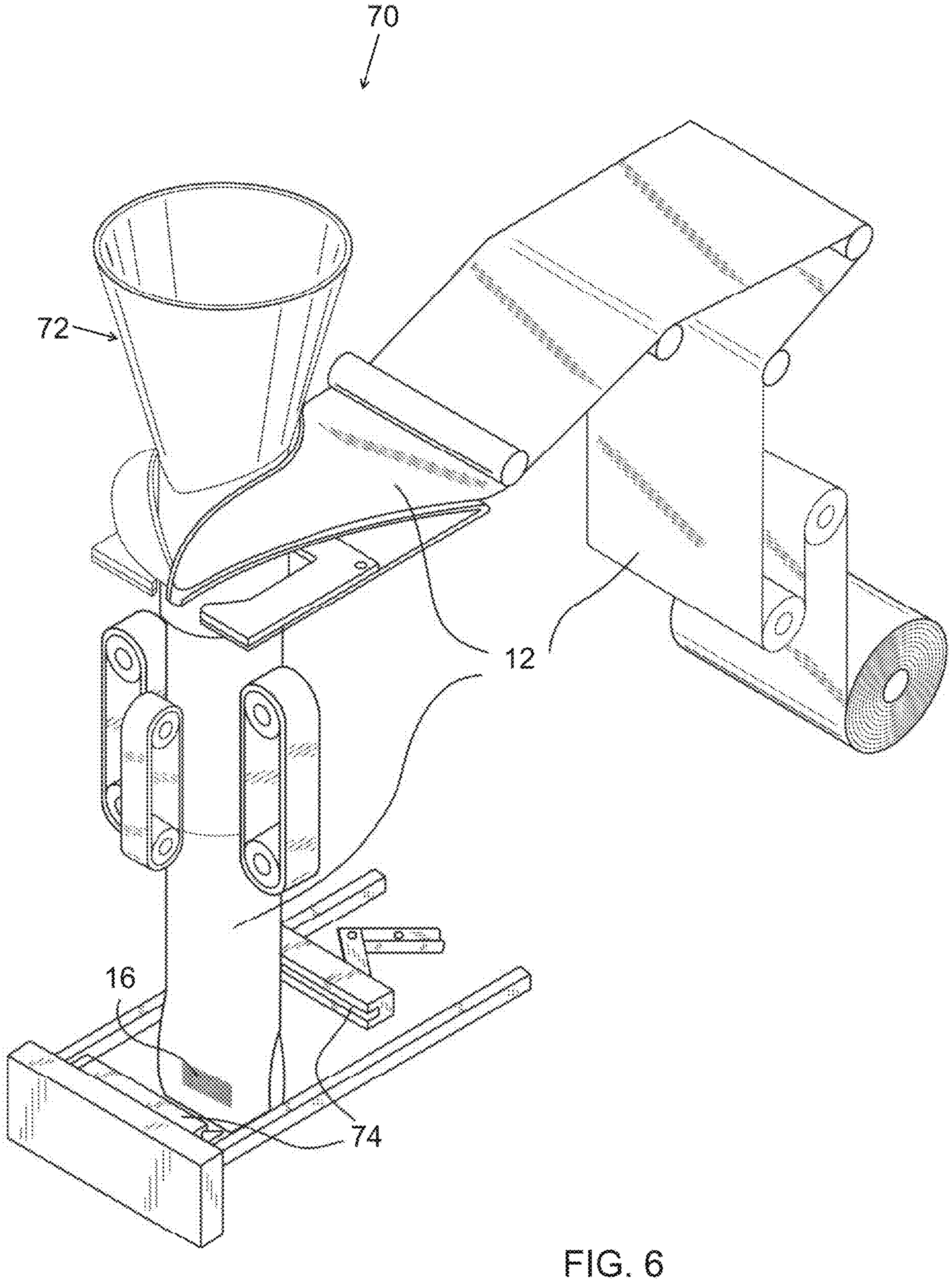
FIG. 6 is a perspective view of an automated filling machine illustrating the process of forming and filling the bag.

Referring to FIGS. 3 and 6, at step 122, the finished roll stock of paper is then placed in an automated forming and filling machine 70 for assembly and filling of the roll stock of paper for form the individually filled bags of the present invention.

Such automated forming and filling machines are known to the industry for this purpose. Examples of such machines include the Phazer XP from Parsons-Eagle Packaging Systems (De Pere, WI) and the XYM15 series from Triangle Package Machinery Company (Chicago, IL). These machines are used to form and fill bags with produce, confectionary, and dry flowable products. However, these machines have been produced and manufactured to form and fill plastic bags and/or plastic-coated paper bags by heating the plastic to create a seal. Advantageously, the particular combination of paper, adhesive, and the particular way of applying said adhesive described above in the present invention allows the paper bag of the present invention to be formed and filled on already existing automated forming and filling machines manufactured for plastic bags.

At step 124, the automated forming and filling machine forms the body of the bag. For example, the automated filling machine depicted in FIG. 6 wraps the finished roll stock of paper around a cylinder form 72 to form the bag.

At step 126, the automated forming and filling machine heat seals formed seams of the body of the bag. For example, the automated filling machine depicted in FIG. 6 heat seals the side seam formed by the paper around the cylinder form 72.

At step 128, the automated forming and filling machine adds product (e.g. potatoes) to the bag. For example, the automated filling machine depicted in FIG. 6 adds product to the cylinder 72 which causes the product to fill the bag. In embodiments where the bag is only formed and not filled on the automated forming and filling machine, this step is skipped.

At step 130 the automated forming and filling machine heat seals the remainder of the unsealed bag seams, closing the bag with the product inside. For example, the automated filling machine depicted in FIG. 6 heat seals the ends of the bag with a heat-sealing device 74 (using the same adhesive from the printing steps). In embodiments where the bag is only formed and not filled on the automated forming and filling machine, this step is skipped.

At step 132, the automated forming and filling machine cuts the now formed and filled bag from the paper roll and a heat-sealed, 100% recyclable and compostable, single ply paper bag with optional window and product is created. In embodiments where the bag is only formed and not filled on the automated forming and filling machine, the bag formed is not filled with product.

Steps 122-132 are repeated until the paper roll has been completely transformed into formed, filled, and sealed bags.

Figure 7:
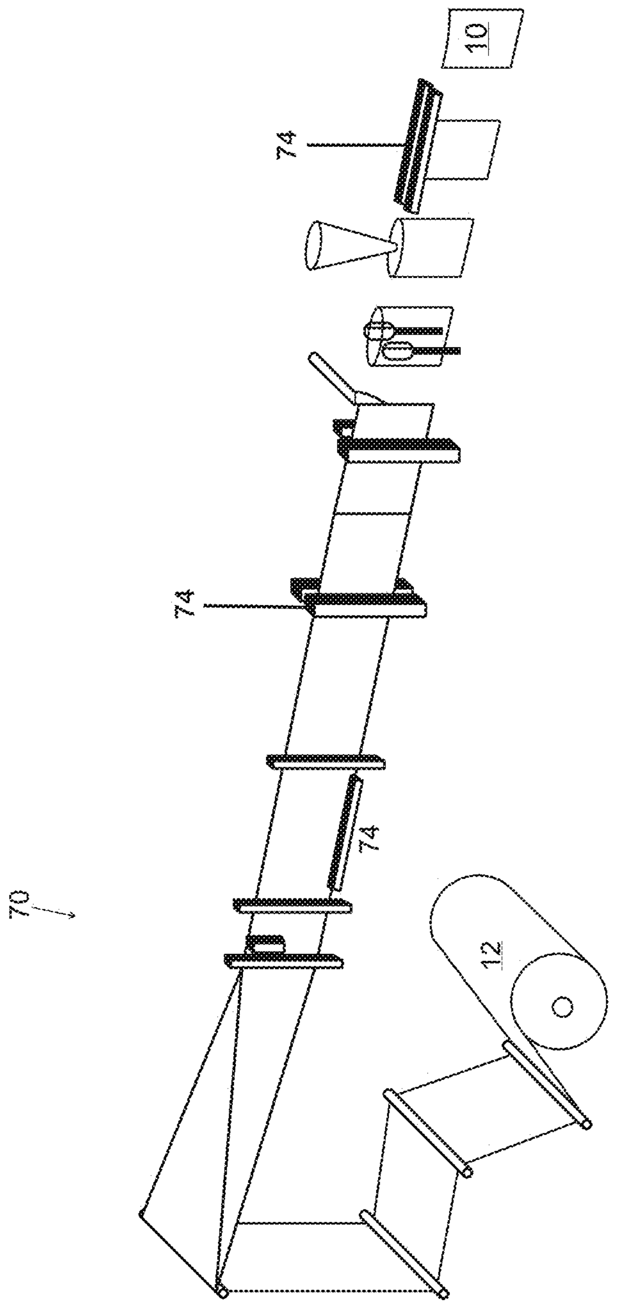
FIG. 7 is a perspective view of a different automated filling machine illustrating the process of forming and filling the bag.

It should be understood that steps 124 through 132 may differ slightly and occur in different order based on the automated forming and filling machine used, including the use of pouch opening devices and bag forming devices. However, the bag of the present invention is capable of being configured to be formed and filled on any known automated forming and filling machine used for plastic and plastic-coated paper bags. FIG. 6 illustrates the process of the above steps being performed on a top fill embodiment of an automated filling machine. FIG. 7 illustrates the process of performing the sealing and filling steps in another embodiment of an automated filling machine.

This process 100 allows minimal processing of the bag, utilizing already existing equipment manufactured to process plastic bags and allowing the cost of paper bags to become competitive with other bag substrates.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms “a,” “an,” and “the” include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., “references”) cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A paper bag, the paper bag comprising:

a body, formed from a single ply paper formed into a tube shape, wherein the tube shape is formed by a seam running along a length of the body, the seam including a first portion of paper running along the length of the body and a second portion of paper running along the length of the body, wherein the first portion of paper and the second portion of paper each include an adhesive printed, in register such that the adhesive of the first portion is sealed to the adhesive of the second portion to form the seam;

a top, wherein the top is made to be sealed with the adhesive printed, in register, on the paper;

a bottom, wherein the bottom is made to be sealed with the adhesive printed, in register, on the paper; and the adhesive, wherein the adhesive is printed onto the paper of the bag in a predetermined pattern prior to forming the bag with a standard printing machine, further wherein the adhesive is applied to the paper in register, and further wherein the adhesive is activated by heat sealing and adhering a portion of the paper to a second portion of the paper, wherein each portion of paper to be heat sealed contains the printed adhesive.

2. The paper bag of claim 1, wherein the paper is calendared paper.

3. The paper bag of claim 1, wherein the adhesive is a polyvinyl acetate with low viscosity.

4. The paper bag of claim 1, the paper bag further comprising:

one or more window cutouts formed in the body of the paper bag, wherein the predetermined pattern includes printing the adhesive along an outside perimeter of each window cutout; and a window covering for each window cutout, wherein the window covering is heat sealed to the adhesive applied to the outside perimeter of the window cutout, such that the window covering covers the area of the window cutout to prevent a product from falling out of the paper bag, wherein the window covering is a wood-based compostable scrim or a wood-based compostable glassine, further wherein the adhesive is applied to all edges of the window covering to match with the adhesive applied to the borders of the window portion of the paper, further wherein the adhesive of the paper is sealed to the adhesive of the window covering.

5. The paper bag of claim 4, the paper bag further comprising:

a paper frame for each window cutout, wherein the paper frame is applied over an outer perimeter of the window covering to frame the window cutout and the adhesive of the paper frame is heat sealed with the adhesive of the window covering to the adhesive applied to the outside perimeter of the window cutout.

6. The paper bag of claim 1, the paper bag further comprising:

printed indicia on the paper of the paper bag, wherein the printed indicia is applied by the standard printing machine simultaneously to the printing of the adhesive.

7. The paper bag of claim 1, wherein the paper bag is 100% recyclable and compostable.

* * * * *